Patented Jan. 6, 1925.

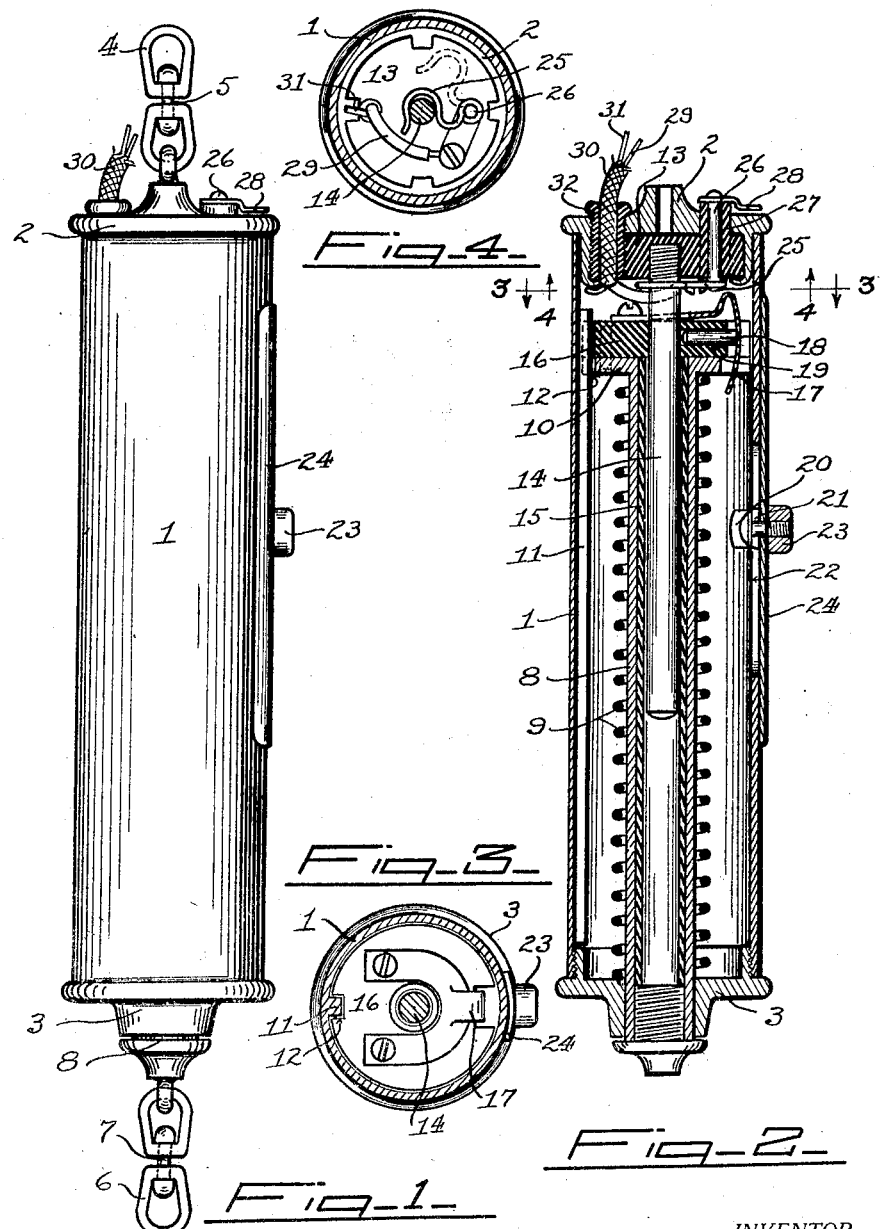

1,522,471

UNITED STATES PATENT OFFICE.

GAETANO E. SIINO, OF PITTSBURG, CALIFORNIA.

SIGNAL DEVICE FOR FISHING LINES.

Application filed June 28, 1921. Serial No. 481,097.

*To all whom it may concern:*

Be it known that I, GAETANO E. SIINO, citizen of the United States, residing at Pittsburg, in the county of Contra Costa and State of California, have invented certain new and useful Improvements in Signal Devices for Fishing Lines, of which the following is a specification.

My invention relates to that class of devices adapted to be connected with a fishing line, whereby a sudden pull on the line, such as that caused by a fish caught on the hook, gives a signal perceptible to the fisherman.

Such devices are of great convenience to fishermen, especially those who make a business of deep-water fishing from boats, by enabling one man to tend a number of lines without the necessity of watching them constantly, and, for the same reason, they enable a man to handle more lines than he could do without them. The objects of my present invention are to provide such a device which can be easily and conveniently inserted in a fishing line, which will function properly even though wet by spray or rain, and which is adjustable for different degrees of normal tension on the line. Thus the same indicator can be used on either a long and heavy line or on a short and light line, by merely changing its adjustment. In either case, when properly adjusted, it will function as a signal only when the normal pull is exceeded.

Broadly speaking, my invention comprises an electrical contact device adapted to be inserted in a fishing line and connected with a source of current and a bell or other signal in such a manner that a sudden pull on the line will close the electric circuit and cause the bell to ring. The source of current and the bell may be located anywhere, as, for example, in the cabin of the boat, and may be used with any number of contact devices. If desired, an annunciator of some suitable form may be used to designate the particular line under tension. Thus the fisherman may remain in the cabin in bad weather, going out only when called to some particular line.

With this in view, my invention will now be fully described in its preferred form, but it is to be understood that changes, within the scope of the claims hereto appended, may be made in the form and construction of the invention without departing in any degree from the spirit thereof.

Reference should be had to the accompanying drawings, wherein—

Fig. 1 is an exterior view of my device.

Fig. 2 is a longitudinal section thereof, the end swivel connections being omitted.

Fig. 3 is a transverse section, taken in the direction of the arrows on the line 3—3 of Fig. 2.

Fig. 4 is a transverse section taken in the direction of the arrows 4 on the same line of Fig. 2.

In the drawings, the reference numeral 1 designates a cylindrical shell having closed ends 2 and 3. The end 2, which may be regarded as the upper end, has a ring 4 secured to it by a swivel connection 5, as shown in Fig. 1. At the lower end, a second ring 6 is secured, by a swivel connection 7 to a rod 8, which is adapted to slide through the shell end 3. Within the shell, a spring 9, Fig. 2, surrounds the slidable rod 8 and lies between a head 10 carried by said rod and the lower end 3 of the shell. Said spring 9, therefore, tends to keep the rod 8 retracted within the shell 1. A longitudinal guide rib 11, formed on the interior of said shell, cooperates with a groove 12 formed in the head 10 to prevent said head from turning.

The upper end 2 of the shell 1 is fitted interiorly with a plate or disk 13 of insulating material, from which extends downwardly a fixed central metallic rod 14. The slidable rod 8 is hollow, and is fitted with an insulating sleeve or bushing 15, which slides over said central rod 14. Said rod 14 thus forms a guide for the movable rod 8 and its head 10. Said head 10 carries a block 16 of insulating material, to which is secured a projecting spring contact brush 17. Said brush is in contact with a pin 18, slidably mounted in a socket 19 in the insulating block 16, and which is pressed against the central rod 14 by said spring brush 17.

The contact brush 17 is adapted to make contact with a button 20 projecting interiorly from the shell 1. Said button is fixed to a slide 21, which operates in a slot 22 formed longitudinally in said shell. An exterior button or finger piece 23 is provided for moving said slide, and an exterior guard plate 24 closes the slot 22 to prevent the entrance of water. The contact button 20 is grounded electrically on the shell 1.

A switch for manually opening the circuit is provided, comprising a swinging contact arm 25, secured to a rod 26 extending through an insulating bushing 27 mounted in the head 2. An exterior handle 28 is secured to said rod 26, for moving the contact arm into and out of connection with the central fixed rod 14, as shown in Figs. 2 and 4. Said contact arm 25 is connected with one wire 29 of a cable 30, the other wire 31 thereof being grounded on the shell 1 through the head 2, and said cable 30 is led out through a suitable bushing 32. The electric circuit of the device therefore includes the wire 29, the switch arm 25, the central rod 14, the contact pin 18, the spring brush 17, the contact button 20, the shell 1 and head 2, and the wire 31. The wires 29 and 31 may be led to any desired point, and connected in any suitable manner with a source of current and a bell or other indicating device. Said source of current and indicating device and their connections form no part of the present invention, and, being devices in common use, are not illustrated in the accompanying drawings.

The device embodying my invention is let into a fishing line by means of its swivelled rings 4 and 6, one end being tied to some suitable stationary support and the line being tied to the other end. The weight of the line and its sinker will then cause the rod 8 to be drawn part way out, compressing the spring 9. The adjustable contact button 20 is then set in such a position that it is slightly below the brush 17, and the switch 25 is closed. When a fish is caught, the line is given a sudden pull, drawing out the rod 8 still further, and causing the brush 17 to make connection with the contact button 20, thereby closing the circuit and causing the indicating device to function. By opening the switch 25, the circuit may be opened, thereby throwing the indicating device out of operation before the tension on the fishing line is relieved.

I claim:—

1. A signal device for fishing lines comprising a shell having closed ends; a longitudinally slidable hollow rod within said shell and extending through the lower end thereof; means for attaching a fishing line to the projecting end of said rod; a spring for resisting the tension of said line; a central guide fixed to and insulated from the upper end of said shell and extending into said hollow rod; an insulating sleeve between said guide and said hollow rod; a contact brush carried by said rod and adapted to make electrical connection with said guide; a contact member adjustably carried by said shell and adapted for engagement by said brush; and means for respectively connecting said guide and said contact member in an electrical circuit.

2. A signal device for fishing lines comprising a shell having closed ends; a longitudinally slidable hollow rod within said shell and extending through the lower end thereof; means for attaching a fishing line to the projecting end of said rod; a spring for resisting the tension of said line; a central guide fixed to and insulated from the upper end of said shell and extending into said hollow rod; an insulating sleeve between said guide and said hollow rod; a contact brush carried by said rod and adapted to make electrical connection with said guide; a contact member carried by said shell and adapted for engagement by said brush; a second contact member movable into and out of electrical connection with said guide; and means for connecting said contact members in an electrical circuit.

In testimony whereof I have signed my name to this specification.

GAETANO E. SIINO.